(12) United States Patent
Colosimo

(10) Patent No.: US 10,822,084 B2
(45) Date of Patent: Nov. 3, 2020

(54) PAYLOAD LAUNCH APPARATUS AND METHOD

(71) Applicant: BAE Systems plc, London (GB)

(72) Inventor: Nicholas Giacomo Robert Colosimo, Preston Lancashire (GB)

(73) Assignee: BAE Systems plc, London (GB)

( * ) Notice: Subject to any disclaimer, the term of this patent is extended or adjusted under 35 U.S.C. 154(b) by 292 days.

(21) Appl. No.: 15/768,716

(22) PCT Filed: Oct. 28, 2016

(86) PCT No.: PCT/GB2016/053353
§ 371 (c)(1),
(2) Date: Apr. 16, 2018

(87) PCT Pub. No.: WO2017/072524
PCT Pub. Date: May 4, 2017

(65) Prior Publication Data
US 2018/0265199 A1    Sep. 20, 2018

(30) Foreign Application Priority Data

Oct. 30, 2015 (EP) ..................................... 15275225
Oct. 30, 2015 (GB) ..................................... 1519181

(51) Int. Cl.
*B64D 1/12* (2006.01)
*B64D 1/10* (2006.01)
(Continued)

(52) U.S. Cl.
CPC ................. *B64D 1/12* (2013.01); *B64D 1/10* (2013.01); *B64C 39/024* (2013.01); *B64C 2201/108* (2013.01); *B64D 17/00* (2013.01)

(58) Field of Classification Search
CPC ........ B64C 2201/121; B64C 2201/128; B64D 1/12; B64D 1/10
See application file for complete search history.

(56) References Cited

U.S. PATENT DOCUMENTS

| 1,790,309 A | 1/1931 | Keintz |
| 2,349,858 A | 5/1944 | Gillmor |
(Continued)

FOREIGN PATENT DOCUMENTS

| CN | 104787315 A | 7/2015 |
| CN | 204822073 U | 12/2015 |
(Continued)

OTHER PUBLICATIONS

International Search Report and Written Opinion of International Application No. PCT/GB2016/053347. dated Jan. 18, 2017, 13 pages.
(Continued)

*Primary Examiner* — Philip J Bonzell
*Assistant Examiner* — Tye William Abell
(74) *Attorney, Agent, or Firm* — Maine Cernota & Rardin

(57) ABSTRACT

Apparatus for releasing a payload from an air vehicle (14), the apparatus comprising a generally tubular holding device (10) mounted on, or formed integrally with, said air vehicle, said holding device (10) having an open end facing in a direction substantially opposite to the direction of travel (16) of said air vehicle (14), in use, the apparatus further comprising a container (18) for housing said payload and configured to be at least partially received within said holding device (10), at least one releasable retaining device (20) for releasably retaining said container (18) within said holding device (10), and an actuation device for selectively actuating said at least one releasable retaining device to release said container from said holding device, said container (18) having thereon at least one drag inducing device (22) configured to induce drag in a direction substantially opposite to that of said direction of travel (16) of said air vehicle, in use, so as to act to drag said container (18) from said holding device (10) through said open end.

20 Claims, 5 Drawing Sheets

(51) Int. Cl.
*B64C 39/02* (2006.01)
*B64D 17/00* (2006.01)

(56) References Cited

U.S. PATENT DOCUMENTS

| | | | |
|---|---|---|---|
| 2,479,125 | A | 8/1949 | Leonard |
| 3,136,501 | A | 6/1964 | Barber |
| 4,123,020 | A | 10/1978 | Korsak |
| 4,522,104 | A * | 6/1985 | Degen ............... B64D 1/04 89/1.51 |
| 5,267,885 | A | 12/1993 | Niskern |
| 5,279,199 | A * | 1/1994 | August ............... B64D 7/08 102/351 |
| 5,765,783 | A | 6/1998 | Albion |
| 6,260,796 | B1 | 7/2001 | Klingensmith |
| 6,477,326 | B1 | 11/2002 | Partynski |
| 8,544,788 | B1 | 10/2013 | Capper |
| 9,085,354 | B1 | 7/2015 | Peeters |
| 2003/0179288 | A1 | 9/2003 | Jones |
| 2003/0185549 | A1 | 10/2003 | Partynski |
| 2008/0105112 | A1* | 5/2008 | Grabmeier ............... B64D 1/12 89/1.51 |
| 2008/0223994 | A1 | 9/2008 | Greenley |
| 2010/0025543 | A1 | 2/2010 | Kinsey et al. |
| 2010/0228406 | A1 | 9/2010 | Hamke |
| 2010/0252690 | A1 | 10/2010 | Hothi |
| 2012/0248259 | A1 | 10/2012 | Page et al. |
| 2013/0162761 | A1 | 6/2013 | Goldemann |
| 2013/0250047 | A1 | 9/2013 | Hollinger |
| 2014/0008498 | A1 | 1/2014 | Reiter |
| 2014/0340427 | A1 | 11/2014 | Baker |
| 2018/0370624 | A1 | 12/2018 | Seale |

FOREIGN PATENT DOCUMENTS

| | | |
|---|---|---|
| DE | 1269497 B | 5/1968 |
| DE | 102006021182 A1 | 11/2007 |
| DE | 102007054126 A1 | 5/2009 |
| EP | 1873058 A2 | 1/2008 |
| FR | 757191 A | 12/1933 |
| FR | 2246444 A1 | 5/1975 |
| FR | 2379430 A2 | 9/1978 |
| FR | 2796454 A1 | 1/2001 |
| GB | 272455 A | 12/1927 |
| GB | 2514582 A | 12/2014 |
| JP | H03292294 A | 12/1991 |
| JP | 2012111475 A | 6/2012 |
| RU | 2072942 C1 | 2/1997 |
| RU | 2330790 C2 | 8/2008 |
| WO | 03063513 A1 | 7/2003 |
| WO | 2008112686 A1 | 9/2008 |
| WO | 2009059173 A1 | 5/2009 |
| WO | 2012029063 A1 | 3/2012 |
| WO | 2012035153 A1 | 3/2012 |
| WO | 2013109742 A1 | 7/2013 |
| WO | 2013120912 A1 | 8/2013 |
| WO | 2014118299 A1 | 8/2014 |
| WO | 2014177591 A1 | 11/2014 |
| WO | 2016109408 A | 7/2016 |
| WO | 2017007915 A1 | 1/2017 |

OTHER PUBLICATIONS

Search Report under Section 17(5) of Great Britain Application No. GB1519180.2, dated Apr. 27, 2016, 3 pages.
Combined Search and Examination Report under Sections 17 and 18(3) of Great Britain Application No. GB1618228.9, dated Mar. 29, 2017, 7 pages.
Extended European Search Report of European Application No. EP15275224, dated Mar. 24, 2016, 8 pages.
International Search Report and Written Opinion of International Application No. PCT/GB2016/053348, dated Jan. 19, 2017, 18 pages.
Search Report under Section 17(5) of Great Britain Application No. GB1519178.6, dated Apr. 25, 2016, 3 pages.
Combined Search and Examination Report under Sections 17 and 18(3) of Great Britain Application No. GB1618236.2, dated Mar. 30, 2017, 6 pages.
Extended European Search Report of European Application No. EP15275223.4, dated Jun. 6, 2016, 12 pages.
International Search Report and Written Opinion of International Application No. PCT/GB202016053345, dated Jan. 11, 2017, 12 pages.
Search Report under Section 17(5) of Great Britain Application No. GB1519177.8, dated Apr. 25, 2016, 4 pages.
Extended European Search Report of European Application No. EP15275222.6, dated Apr. 27, 2016, 8 pages.
International Search Report and Written Opinion of International Application No. PCT/GB2016/053346, dated Jan. 9, 2017, 15 pages.
Search Report under Section 17(5) of Great Britain Application No. GB1519183.6, dated Apr. 29, 2016, 3 pages.
Combined Search and Examination Report under Sections 17 and 18(3) of Great Britain Application No. GB1618221.4, dated Mar. 23, 2017, 5 pages.
[Squadrone Systems] Hexo+ aerial drone system Kickstarter page, explaining key features, stored bu internet archive on Jul. 26, 2014. Found at http://web.archive.org/web/20140726061306/https://www.kickstarter.com/projects/sqdr/hexo-your-autonomous-aerial-camera Accessed Mar. 3, 2017.
Extended European Search Report of European Application No. EP15275226.7, dated Jul. 4, 2016, 12 pages.
International Search Report and Written Opinion of International Application No. PCT/GB2016/053353, dated Dec. 15, 2016, 11 pages.
Search Report under Section 17(5) of Great Britain Application No. GB1519181.0, dated Apr. 28, 2016, 3 pages.
Extended European Search Report of European Application No. EP15275225.9, dated May 13, 2016, 8 pages.
International Preliminary Report on Patentability of International Application No. PCTGB2016053346, dated May 11, 2018, 11 pages.
International Preliminary Report on Patentability of International Application No. PCTGB2016053347, dated May 11, 2018, 9 pages.
International Preliminary Report on Patentability of International Application No. PCTGB2016053348, dated May 11, 2018, 11 pages.
International Preliminary Report on Patentability of International Application No. PCTGB2016053345, dated May 11, 2018, 8 pages.
International Preliminary Report on Patentability of International Application No. PCTGB2016053353, dated May 11, 2018, 8 pages.
Notice of Allowance for U.S. Appl. No. 15/768,729, dated Jun. 25, 2020, 16 Pages.

* cited by examiner

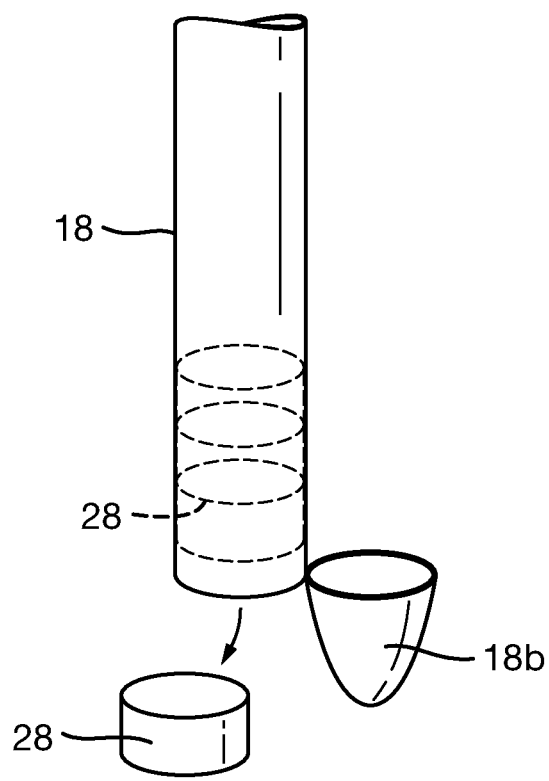

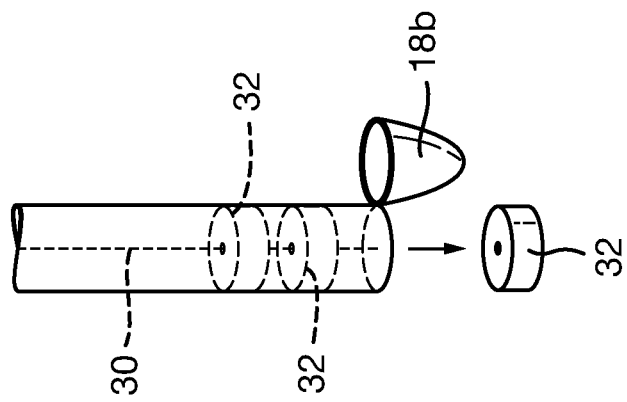
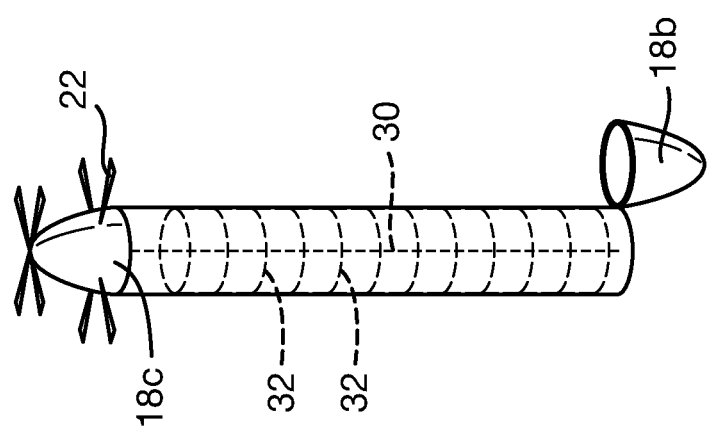
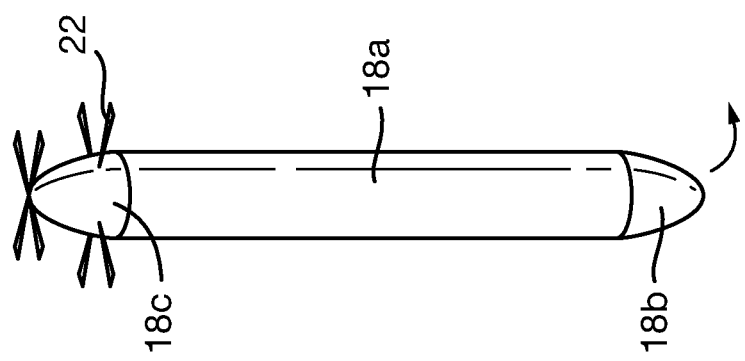

PAYLOAD LAUNCH APPARATUS AND METHOD

RELATED APPLICATIONS

This application is a national phase application filed under 35 USC § 371 of PCT Application No. PCT/GB2016/053353 with an International filing date of Oct. 28, 2016 which claims priority of GB Patent Application 1519181.0 filed Oct. 30, 2015 and EP Patent Application 15275225.9 filed Oct. 30, 2015. Each of these applications is herein incorporated by reference in its entirety for all purposes.

This invention relates generally to a payload launch apparatus and method for an aircraft and, more particularly but not necessarily exclusively, to an apparatus and method for launching, from an air vehicle, and optionally deploying, a payload that may, for example, comprise a weapon, a sensor or one or more unmanned air vehicles (UAVs) or the like.

It is well known to release certain types of payload from an aircraft once it has reached a predetermined location and/or altitude. The conditions under which such payloads are released, as well as their type, is largely dependent on the application or purpose to which they are intended.

For example, large, static payloads may simply be dropped from hook-type releases or cradles through doors or hatches that open at the bottom of an aircraft's fuselage. Other static payloads may be loaded or mounted on ejector racks that offer a degree of propulsion as the payload (e.g. seat or weapon) is ejected from the aircraft. Self-propelled payloads may also be released from an aircraft, whereby they accelerate into autonomous flight once clear of the host aircraft.

However, in all cases, there is a significant problem posed by the fact that, initially, the payload will continue to move in the direction of travel of the aircraft, until its forward acceleration is sufficiently dampened and overcome by gravitational forces. Thus, initially, there is little or no control over the payload or its clearance from the flow field around the host aircraft. These and additional problems are becoming increasingly prohibitive in relation to the release of a payload from very high speed aircraft (e.g. supersonic or hypersonic) and, as high speed aircraft technologies develop, there is increasing investigation into solving the inherent problems associated with releasing a payload at high speeds. The main issue here is that, particularly at higher speeds (especially hypersonic), the above-mentioned flow field is unpredictable and its turbulent effects are particularly difficult to predict. Therefore, there is a high risk, using conventional payload release mechanisms, that the payload will collide with the host aircraft and cause a catastrophic failure.

There is, therefore, an ongoing desire to provide a high speed payload launch apparatus and method that can be effectively used for many different types of payload to quickly and accurately release it from an aircraft, and attain high speed and reliable clearance from the host aircraft, thereby avoiding the issues referenced above.

It is an object of aspects of the present invention to address at least some of these issues and, in accordance with a first aspect of the present invention, there is provided apparatus for releasing a payload from an air vehicle, the apparatus comprising a generally tubular holding device mounted on, or formed integrally with, said air vehicle, said holding device having an open end facing in a direction substantially opposite to the direction of travel of said air vehicle, in use, the apparatus further comprising a container for housing said payload and configured to be at least partially received within said holding device, at least one releasable retaining device for releasably retaining said container within said holding device, and an actuation device for selectively actuating said at least one releasable retaining device to release said container from said holding device, said container having thereon at least one drag inducing device configured to induce drag in a direction substantially opposite to that of said direction of travel of said air vehicle, in use, so as to act to drag said container from said holding device through said open end.

Thus, the payload is released 'behind' the host air vehicle and the holding device constrains its lateral and vertical (or any other 'off-longitudinal' axis) motion such that, upon its complete exit, the payload is clear of the air vehicle, and any unconstrained off-longitudinal axis motion thereof does not have any effect on the host air vehicle. It will be appreciated that, in an optimum configuration, said open end of said holding device may be located 'aft' or behind any other airframe feature of the host air vehicle.

Optionally, said holding device may include an elongate pole therein, extending along at least a portion of its longitudinal axis, said container being configured to be slidably mounted within said holding device on said pole.

In an exemplary embodiment, the apparatus may include a closure device for closing said open end of said holding device after said container has been released therefrom. In an exemplary embodiment, the closure device may be coupled to said container such that, as said container is released, said closure device is moved thereby to close said open end. In this case, breakable or releasable coupling means may be provided to couple said closure device to said container, said coupling means being configured to break or otherwise release said container from said closure device as it is completely released from said holding device.

In an exemplary embodiment of the invention, the said container may comprise a canister having a proximal end nearest said open end of said holding device when it is retained therein, and an opposite distal end. The above-mentioned drag inducing device may then be located at or near the proximal end of the canister. The container may comprise a generally cylindrical canister having a conical nose portion at the above-mentioned proximal end. In this case, the above-mentioned drag inducing device may be located at or near the apex of the conical nose portion. The canister may have a releasable or removable cover member at the distal end and, in the case of a cylindrical canister having a conical tail portion at its distal end portion, the conical tail portion itself may comprise the releasable or removable cover member. In either case, the releasable/removable cover may be configured to open after the container has been dragged from the holding device, so as to enable the payload to be released therefrom, when at a desired speed and/or orientation.

In an exemplary embodiment, the drag inducing device may comprise one or more resilient flaps or fins extending from the proximal end of the container at an angle relative to the longitudinal axis thereof. In an exemplary embodiment, the one or more resilient flaps or fins may extend substantially orthogonally relative to the longitudinal axis of the container so as to maximise the resistance they generate relative to the direction of travel of the air vehicle. In some exemplary embodiments, the drag inducing device may comprise a plurality of resilient elongate flaps or fins, each extending from a generally central location at the proximal end of the container, and angularly oriented relative to each other. In some embodiments, the flaps or fins may be equi-angularly spaced or oriented relative to each other, for example, forming an asterisk-like formation. In the case where the drag inducing device comprises a plurality of resilient fins or flaps, each extending from a generally central location at the proximal end of the container, such fins or flaps may be pivotally mounted at said central location and movable from a first configuration in which at least some of them are oriented at the same angle, to a second configuration, when said container is released from said holding device, in which said fins or flaps are angularly separated.

The or each payload may have a generally central aperture defining a channel substantially orthogonal to its lateral axis. In this case, the canister may include an elongate retaining member located generally centrally therein and extending substantially parallel to, or in line with, the longitudinal axis thereof, wherein said one or more payloads are retained within said container such that said retaining member extends through the or respective said aperture(s) therein.

In the case where a plurality of payloads is housed within the container, stacked along said elongate retaining member, the apparatus may be configured to release each payload in turn from the open end of the container when said container has been released from said holding device.

In another exemplary embodiment, the container may comprise a plurality of generally ring-like sections, pivotally mounted on an elongate retaining member, wherein each section is configured to receive a payload, and said sections are movable from a first configuration, in which they are substantially aligned, and a second configuration in which adjacent sections are axially offset from each other to allow the payloads retained therein the be released therefrom.

The payload may, for example, comprise one or more unmanned aerial vehicles (UAVs) and, optionally, one or more rotary-wing UAVs.

In accordance with another aspect of the present invention, there is provided a method of releasing a payload from an air vehicle, the method comprising providing, in or on said air vehicle, apparatus as described above, releasing said container from said holding device and causing said drag inducing device to be deployed, and opening said container to release said payload therefrom.

In accordance with yet another aspect of the present invention, there is provided an air vehicle comprising a main body and at least a pair of wing members extending therefrom, the air vehicle further comprising a holding device for apparatus as described above mounted on, or formed integrally with, at least one of said wing members.

These and other aspects of the present invention will be apparent from the following specific description, in which embodiments of the present invention are described, by way of examples only, and with reference to the accompanying drawings, in which:

FIG. 5 is a schematic side view of apparatus according to an exemplary embodiment of the present invention;

FIGS. 6A, 6B and 6C are schematic side views of apparatus according to another exemplary embodiment of the present invention at respective stages of deployment.

Figure 1:
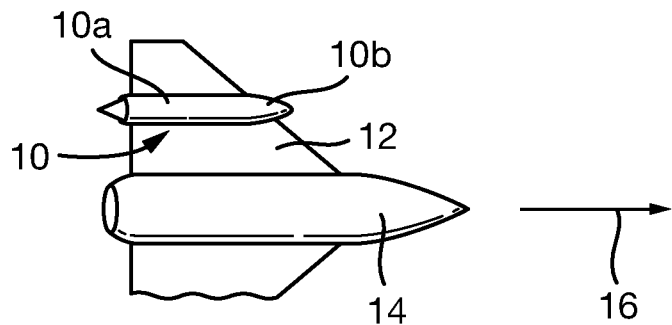
FIG. 1 is a schematic plan view of an air vehicle having apparatus according to an exemplary embodiment of the invention mounted thereon.

Referring to FIG. 1 of the drawings, apparatus according to an exemplary embodiment of the present invention comprises a generally tubular holding device 10 over-slung on a wing member 12 of an air vehicle 14. It will be appreciated that the holding device 10 may equally be underslung on the wing member and/or formed integrally with the lower or upper surface of the wing member, and the present invention is not necessarily intended to be limited in this regard. Indeed, the holding device 10 may be mounted on, or formed integrally with, any part of the airframe of the vehicle 14, but it is to be understood that, in an optimum configuration, its open end or 'trailing edge' would nominally be aft of any other part of the air vehicle.

The direction of travel of the air vehicle, in use, is indicated by arrow 16. It can be seen from FIG. 1 that the holding device 10 is aerodynamically shaped and configured with a generally cylindrical body portion 10a and a conical end portion 10b at the leading end (when the vehicle is travelling in direction 16).

Figure 2:
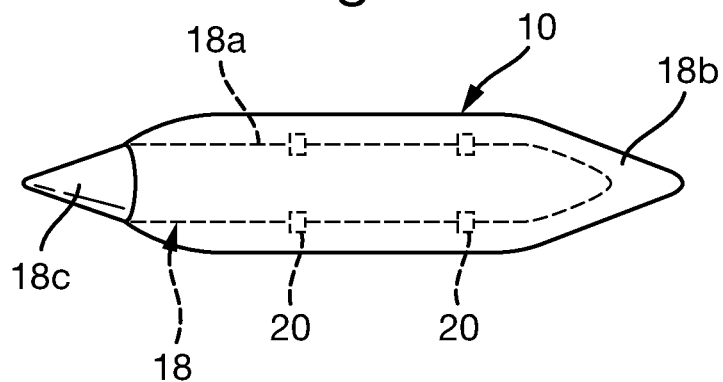
FIG. 2 is a schematic side view of apparatus according to an exemplary embodiment of the present invention.

Referring additionally to FIG. 2 of the drawings, the opposite, trailing end of the holding device 10 is open, and a generally tubular container 18 is retained therein by means of releasable locking pins 20. It will be appreciated that the container 18 may not be of cylindrical cross-section as illustrated and it, and indeed the holding device 10, may be of any suitable cross-sectional shape. The term "generally tubular" is not intended to be in any way limiting as to the cross-sectional shape of the container and holding device. The locking pins retain the container 18 within the holding device 10, and may be remotely and/or automatically operated by an actuating mechanism (not shown) configured to release the locking pins 20 and, therefore, release the container 18. The container 18 has a generally cylindrical main body 18a and a generally conical 'tail' portion 18b at the 'leading' end (when retained within the holding device and the air vehicle is travelling in direction 16). The opposite, 'trailing' end is provided with a generally conical 'nose' portion 18c. In some exemplary embodiments, the conical tail portion 18b may comprise or include a removable or releasable (e.g. by rotation) cover member, but it will be appreciated that the cover member could be provided as part of, or in the form of, the nose portion 18c if required.

In an alternative exemplary embodiment, the container 18 may be slidably mounted on an elongate pole mounted or otherwise provided within the holding device, along its longitudinal axis. Thus, as the container 18 slides out of the holding device along the pole, the pole further acts to constrain its lateral (and other off-longitudinal axis) motion until it exits the holding device and is thus completely clear of the air vehicle.

A deployable drag inducing device (not shown in FIG. 2) is provided at the apex of the nose portion 18c. Such a drag inducing device may comprise one or more resilient fins or flaps, which, when not in use, lie flush against the outer surface of the nose portion 18c. When deployed at the same time, or after, the locking pins 20 have been unlocked and the container released from the within the holding device), the flaps or fins may be moved to extend substantially orthogonally (relative to longitudinal axis of the main body 18a) from the apex of the nose portion 18c (and/or side walls thereof) to generate a resistive force (or 'drag') relative to the direction of motion 16 of the air vehicle 14.

Figure 3:
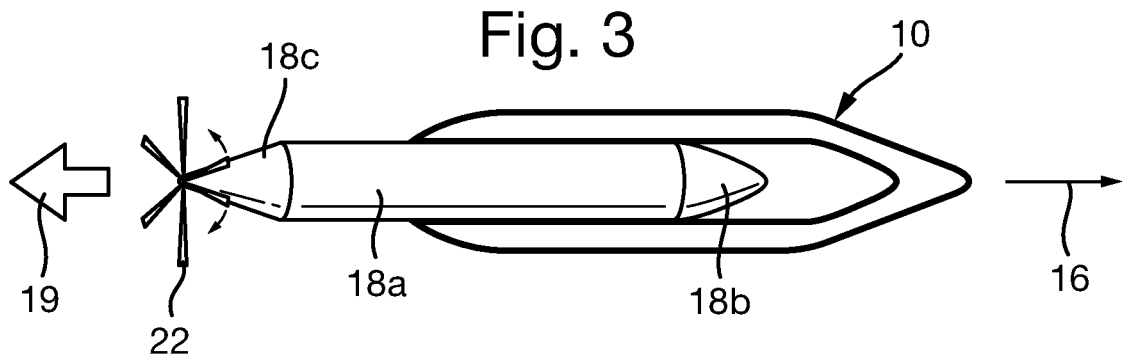
FIG. 3 is a schematic side view of the apparatus of FIG. 2, as the container is released from the holding device, illustrating deployment of the drag inducing device.

Thus, referring to FIG. 3 of the drawings, a plurality of elongate flaps or fins 22 may be pivotally mounted at the apex of the nose portion 18c and deployed, after the locking pins have been unlocked, so as to move from a first configuration, in which they are substantially flush with the outer surface of the nose portion 18c, to a second deployed configuration in which they extend from the outer surface of the nose portion 18c to generate drag. The flaps or fins may all initially be deployed as a 'stack', whereby they are all oriented at the same angle, and then subsequently pivoted relative to each other, to an equi-angularly spaced configuration, of asterisk-like formation.

Figure 4A:
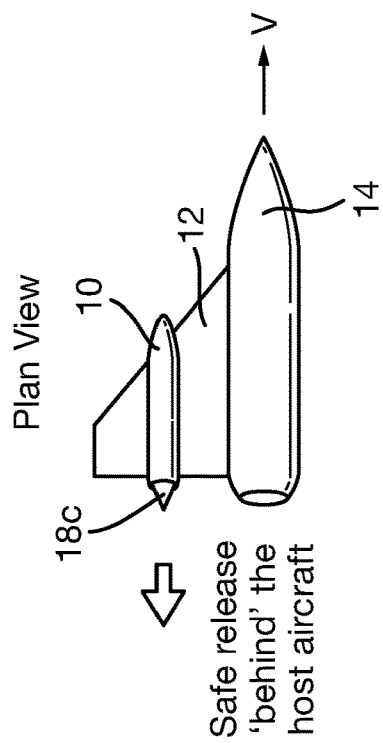
FIGS. 4A-4C are schematic diagrams illustrating stages of deployment of apparatus according to an exemplary embodiment of the present invention.
Figure 4B:
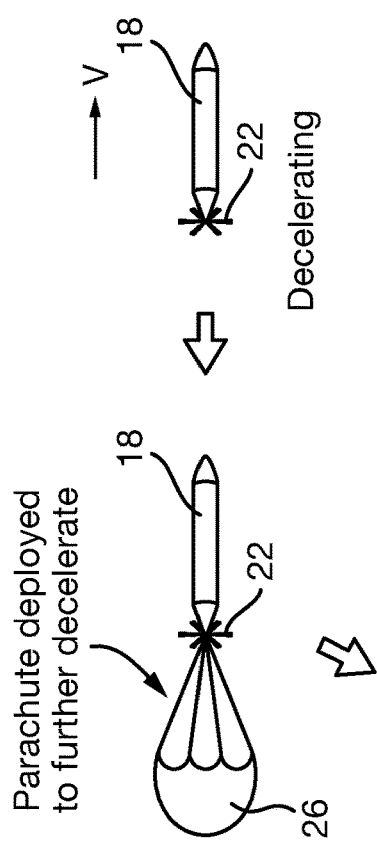
Figure 4C:
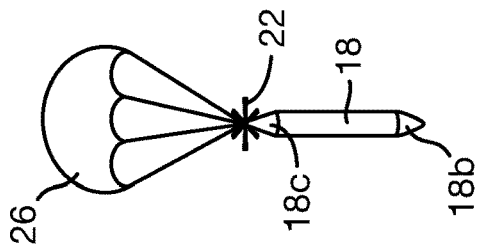

Deployment of the drag inducing device has the effect of generating significant aerodynamic drag in relation to the container 18, causing it to be 'dragged out of the holding device 10. In reality, although it is still travelling in the same direction as the air vehicle, it is decelerating such that the relative velocity between the container and the holding device is significantly different and hence they separate, as shown in FIG. 4 of the drawings. Once clear of the aerodynamic influence of the air vehicle 14, a parachute 26, or similar deceleration device may be deployed, to further decelerate the container 18 and allow it to drop downward to the ground.

The object of the holding device, relative to the container as it is released, is to constrain any lateral (or other off-longitudinal axis) motion thereof until it has completely exited the holding device and is clear of the airframe of the host air vehicle. In an exemplary embodiment, an elongate pole member may be provided within the holding device along its longitudinal axis, on which the container 18 is slidably mounted. Thus, as the container 18 is 'dragged' from the holding device 10, it slides along the pole member and through the open end. The pole member acts to further constrain the above-mentioned off-longitudinal axis motion of the container until it completely exits the holding device and is clear of the airframe of the aircraft.

In an exemplary embodiment, the apparatus comprises a closure device (not shown) housed within the holding device and coupled to the container 18, when the container is within the holding device. The closure device is configured, in use, to close the open end of the holding device 10 such that it does not form a bluff aerodynamic face which may otherwise have an adverse effect on the normal operation of the aircraft. The closure device may be coupled to the container 18 by means of a breakaway cable or the like such that, as the container 18 is 'dragged' from the holding device 10, it causes the closure device to be moved along the inside of the holding device, into position over its open end. As the container 18 exits the holding device, the breakaway cable may be configured to break, thereby releasing the coupling between the closure device and the container, such that the closure device remains in situ over the open end of the holding device and the container 18 is free to clear the aircraft. It will be appreciated that many different types of closured device and/or mechanism could be used to close the open end of the holding device after the container 18 has been released, and the present invention is not necessarily intended to be limited in this regard. However, it will be appreciated by a person skilled in the art that there are technical advantages (in terms of the aerodynamic performance of the host air vehicle) to providing some means for closing the open end of the holding device once the container has been completely released therefrom.

In some exemplary embodiments, the container may house deployable payloads, i.e. payloads that require deployment whilst the container 18 is still airborne. Such a payload may comprise one or more unmanned aerial vehicles (UAVs). In this case, the tail portion 18b of the container 18 may be operable to open after the container has cleared the aerodynamic influence of the air vehicle (but whilst it is still airborne) to release one or more payloads therefrom, at a desired/appropriate speed and/or orientation.

Referring to FIG. 5 of the drawings, such a payload may comprise a single UAV 28 (illustrated highly schematically), housed within the container 18, which can be remotely or automatically operated so as to cause it to be released from the open end of the container 18 when sufficient clearance from the host air vehicle 14 has been achieved, and continue autonomous flight thereafter, according to a predefined mission plan.

Referring to FIGS. 6A, 6B and 6C of the drawings, an axial pole 30 may be provided within the container 18 and run along the length of its longitudinal axis. In this case, a plurality of payloads 32 (such as UAVs) may be housed in a stacked formation within the container 18 for sequential release therefrom when sufficient clearance from the host air vehicle 14 has been achieved. In this case, the payloads 32 are provided with a generally central aperture 34 through which the pole 30 extends, when the payloads 32 are stacked in the container, to prevent axial movement thereof. Once the conical tail portion 18b has been opened (e.g. by rotation), each of the payloads 32 can be sequentially released from the stack, through the open end 18d of the container 18. In the case where the payloads 32 are UAVs, such vehicles may be rotary-wing air vehicles wherein the rotor motion does not cross the central axis of the main body and, therefore, cannot be obstructed by the central pole 30 before the air vehicles have exited the container 18.

Figure 7C:
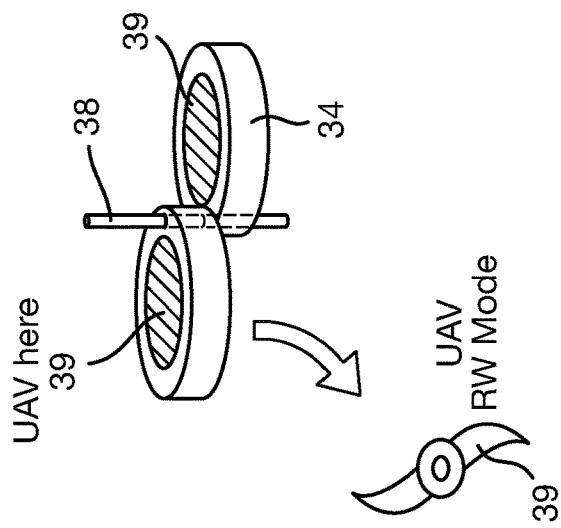
FIGS. 7A, 7B and 7C are schematic side views illustrating apparatus according to another exemplary embodiment of the present invention.
Figure 7B:
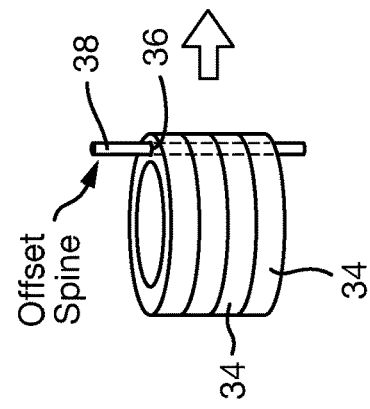
Figure 7A:
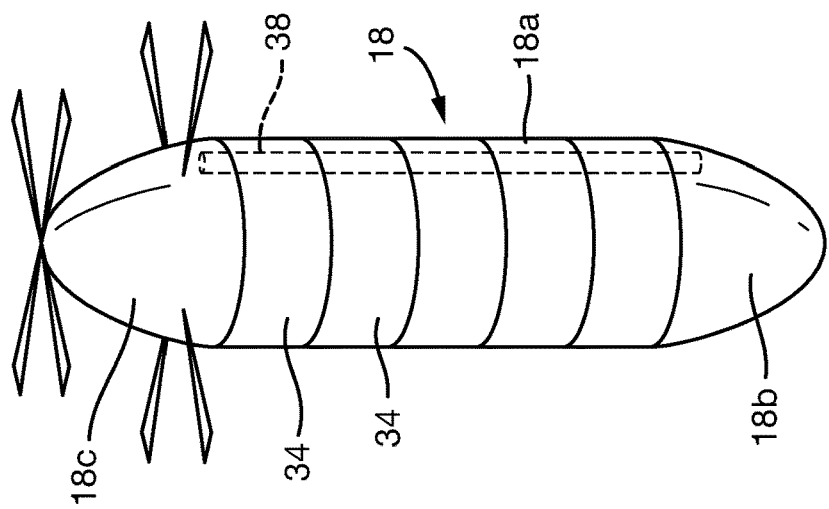

In another exemplary embodiment, and referring to FIGS. 7A, 7B and 7C of the drawings, the container may comprise a plurality of generally ring-like sections 34, each having an aperture 36 formed in the outer wall thereof. The sections 34 are pivotally mounted, via their respective apertures 36 on an elongate pole 38 such that, when they are all aligned, they form a generally tubular main body. The sections 34 may be held in this configuration by releasable clips (not shown) or other releasable locking means. Each section 34 may contain a payload, such as a UAV 39, such that, when the sections 34 of the container are in the aligned configuration, the payloads 39 are in a stacked configuration within the main body 18a. Once the container 18 has been released from the holding device and sufficient clearance from the host air vehicle has been attained, the conical tail portion 18b of the container 18 may open, as before, the sections 34 released from each other and caused to pivot relative to each other about the pole 38, such that adjacent sections 34 are offset relative to each other, leaving sufficient clearance for the payloads therein to be released, as required.

It will be appreciated by a person skilled in the art, from the foregoing description, that modifications and variations can be made to the described embodiments, without departing from the scope of the invention as defined by the appended claims.

The invention claimed is:

1. An Apparatus for releasing a payload from an air vehicle, the apparatus comprising:
   a substantially tubular holding device mounted on, or formed integrally with, said air vehicle, said holding device having an open end facing in a direction substantially opposite to the direction of travel of said air vehicle, in use;
   a container for housing said payload and configured to be at least partially received within said holding device;
   one or more payloads are retained within said container such that said retaining member extends through the or respective said aperture therein,
   the or each payload has a substantially central aperture defining an axial channel, and said container includes an elongate retaining member located substantially centrally therein and extending substantially parallel to, or in line with, the longitudinal axis thereof,
   at least one releasable retaining device for releasably retaining said container within said holding device;
   a actuation device for selectively actuating said at least one releasable retaining device to release said container from said holding device;
   said container having thereon at least one drag inducing device configured to induce drag in a direction substantially opposite to that of said direction of travel of said air vehicle, in use, so as to act to drag said container from said holding device through said open end.

2. The apparatus according to claim 1, wherein a plurality of payloads is housed within the container, stacked along said elongate retaining member, and wherein the apparatus is configured to release each payload in turn from the open end of the container when said container has been released from said holding device.

3. The apparatus according to claim 1, wherein said container comprises a plurality of substantially ring-like sections, pivotally mounted on an elongate retaining member, wherein each section is configured to receive a payload, and said sections are movable from a first configuration, in which they are substantially aligned, and a second configuration in which adjacent sections are axially offset from each other to allow the payloads retained therein the be released therefrom.

4. The apparatus according to claim 1, wherein the one or more payloads comprise one or more unmanned aerial vehicles (UAVs).

5. The apparatus according to claim 1, wherein said holding device includes an elongate pole therein, extending along at least a portion of its longitudinal axis, said container being configured to be slidably mounted within said holding device on said pole.

6. The apparatus according to claim 1, wherein said container comprises a canister having a proximal end nearest said open end of said holding device when it is retained therein, and an opposite distal end.

7. The apparatus according to claim 6, wherein said drag inducing device is located at or near the proximal end of the canister.

8. The apparatus according to claim 1, further comprising a closure device for closing said open end of said holding device after said container has been released therefrom.

9. The apparatus according to claim 8, wherein said closure device is coupled to said container such that, as said container is released from said holding device, said closure device is moved thereby to close said opening.

10. The apparatus according to claim 9, comprising breakable or releasable coupling means for coupling said closure device to said container, said coupling means being configured to break or otherwise release said container from said closure device as it is completely released from said holding device.

11. The apparatus according to claim 1, wherein said drag inducing device comprises:
    one or more resilient flaps or fins movable between a first configuration in which the or each fin or flap is substantially flush with an outer surface of said container;
    a second configuration in which the or each fin or flap extends from said container at an angle relative to the longitudinal axis thereof.

12. The apparatus according to claim 11, wherein the one or more resilient flaps or fins extend substantially orthogonally relative to the longitudinal axis of the container so as to maximise the resistance they generate relative to the direction of travel of the air vehicle.

13. An air vehicle comprising a main body and at least a pair of wing members extending therefrom, the air vehicle further comprising a holding device for apparatus according to claim 11 mounted on, or formed integrally with, at least one of said wing members.

14. An air vehicle comprising a main body and at least a pair of wing members extending therefrom, the air vehicle further comprising a holding device for apparatus according to claim 1 mounted on, or formed integrally with, at least one of said wing members.

15. A method of releasing a payload from an air vehicle, the method comprising providing, in or on said air vehicle, apparatus according to claim 1, releasing said container from said holding device and causing said drag inducing device to be deployed, and opening said container to release said payload therefrom.

16. An apparatus for releasing a payload from an air vehicle, the apparatus comprising:
    a substantially tubular holding device mounted on, or formed integrally with, said air vehicle, said holding device having an open end facing in a direction substantially opposite to the direction of travel of said air vehicle, in use;
    a container for housing said payload and configured to be at least partially received within said holding device
    said holding device including an elongate pole therein, extending along at least a portion of its longitudinal axis, said container being configured to be slidably mounted within said holding device on said pole;
    at least one releasable retaining device for releasably retaining said container within said holding device;
    an actuation device for selectively actuating said at least one releasable retaining device to release said container from said holding device;
    said container having thereon at least one drag inducing device configured to induce drag in a direction substantially opposite to that of said direction of travel of said air vehicle, in use, so as to act to drag said container from said holding device through said open end.

17. An air vehicle comprising a main body and at least a pair of wing members extending therefrom, the air vehicle further comprising a holding device for apparatus according to claim 16 mounted on, or formed integrally with, at least one of said wing members.

18. The apparatus according to claim 16, further comprising a closure device for closing said open end of said holding device after said container has been released therefrom.

19. The apparatus according to claim 16, wherein said container comprises a canister having a proximal end nearest said open end of said holding device when it is retained therein, and an opposite distal end.

20. The apparatus according to claim 19, wherein said drag inducing device is located at or near the proximal end of the canister.

\* \* \* \* \*